United States Patent
Shibayama et al.

(10) Patent No.: US 10,632,701 B2
(45) Date of Patent: Apr. 28, 2020

(54) MANUFACTURING METHOD OF HONEYCOMB STRUCTURE

(71) Applicant: NGK INSULATORS, LTD., Nagoya (JP)

(72) Inventors: Takayoshi Shibayama, Nagoya (JP); Hideki Oka, Nagoya (JP); Shuji Ueda, Nagoya (JP); Hiroyuki Suenobu, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 16/032,360

(22) Filed: Jul. 11, 2018

(65) Prior Publication Data
US 2018/0319114 A1     Nov. 8, 2018

Related U.S. Application Data

(63) Continuation of application No. PCT/JP2017/006537, filed on Feb. 22, 2017.

(30) Foreign Application Priority Data

Feb. 26, 2016  (JP) .................. 2016-035905

(51) Int. Cl.
C04B 35/00       (2006.01)
C04B 35/195      (2006.01)
(Continued)

(52) U.S. Cl.
CPC ..... B29D 99/0089 (2013.01); B01D 39/2086 (2013.01); B01D 39/2089 (2013.01);
(Continued)

(58) Field of Classification Search
CPC ............ B29D 99/0089; B01D 39/2086; B01D 39/2089; B01D 46/2418; C03B 7/07;
(Continued)

(56) References Cited

U.S. PATENT DOCUMENTS 3,725,528 A * 4/1973 Banin ............... B01J 20/12
                                                  423/112
9,429,054 B2 * 8/2016 Ichikawa ........... F01N 3/0222
                    (Continued)

FOREIGN PATENT DOCUMENTS

JP   H07-275712 A1   10/1995
JP   2002-292616 A1  10/2002
              (Continued)

OTHER PUBLICATIONS http://www.webmineral.com/data/Montmorillonite.shtml#.XOPqaflKhaQ Feb. 16, 2015 URL:https://web.archive.org/web/20150216044122/http://www.webmineral.com/data/Montmorillonite.shtml (Year: 2015).*

(Continued)

*Primary Examiner* — Alison L Hindenlang
*Assistant Examiner* — Andrés E. Behrens, Jr.
(74) *Attorney, Agent, or Firm* — Burr & Brown, PLLC

(57) ABSTRACT

A manufacturing method of a honeycomb structure includes a forming step of preparing a forming raw material containing a cordierite forming material and an inorganic binder, and kneading and forming the prepared forming raw material to have a honeycomb shape; and a firing step of firing the prepared formed body. In the forming step, as the inorganic binder, smectite is used in which at least parts of interlayer metal cations are ion-exchanged with non-metal cations. In the smectite, a total amount of sodium to be contained in the smectite is 1.6 mass % or less in terms of oxides to 100 mass % of the smectite. A content ratio of the smectite in the forming raw material is 0.5 parts by mass or more and 4.0 parts by mass or less to 100 parts by mass of the cordierite forming material.

3 Claims, 2 Drawing Sheets

(51) Int. Cl.
| | |
|---|---|
| *B29D 99/00* | (2010.01) |
| *C04B 38/00* | (2006.01) |
| *C04B 35/636* | (2006.01) |
| *C04B 35/63* | (2006.01) |
| *B01J 35/04* | (2006.01) |
| *B01D 39/20* | (2006.01) |
| *B01D 46/24* | (2006.01) |
| *B01J 21/14* | (2006.01) |
| *C04B 35/626* | (2006.01) |
| *C04B 111/00* | (2006.01) |

(52) U.S. Cl.
CPC .......... *B01D 46/2418* (2013.01); *B01J 21/14* (2013.01); *B01J 35/04* (2013.01); *C04B 35/195* (2013.01); *C04B 35/6263* (2013.01); *C04B 35/6303* (2013.01); *C04B 35/6365* (2013.01); *C04B 38/0006* (2013.01); *C04B 2111/0081* (2013.01); *C04B 2111/00793* (2013.01); *C04B 2235/3201* (2013.01); *C04B 2235/3217* (2013.01); *C04B 2235/349* (2013.01); *C04B 2235/3418* (2013.01); *C04B 2235/606* (2013.01); *C04B 2235/6021* (2013.01); *C04B 2235/72* (2013.01); *C04B 2235/9607* (2013.01)

(58) Field of Classification Search
CPC .... C03B 5/04; C03B 5/43; C03B 5/44; C03B 17/064; C03B 5/16
USPC .......................................................... 264/603
See application file for complete search history.

(56) References Cited

U.S. PATENT DOCUMENTS

| | | | |
|---|---|---|---|
| 2003/0151174 A1 | 8/2003 | Makino et al. | |
| 2005/0221053 A1* | 10/2005 | Tomita | B29D 99/0089 |
| 2006/0263574 A1* | 11/2006 | Tsunekawa | B01D 39/202 |
| | | | 428/116 |
| 2014/0113106 A1* | 3/2014 | Tomita | B29D 99/0089 |

FOREIGN PATENT DOCUMENTS

| | | | | |
|---|---|---|---|---|
| JP | 2005/097703 A1 | | 10/2005 | |
| JP | WO2005097703 A1 * | | 2/2008 | .......... C04B 35/195 |
| JP | 4745963 B2 | | 8/2011 | |
| JP | 5001892 B2 | | 8/2012 | |
| JP | 5647051 B2 | | 12/2014 | |
| JP | 5658067 B2 | | 1/2015 | |
| WO | 2005/097703 A1 | | 10/2005 | |
| WO | WO-2005097703 A1 * | | 10/2005 | .......... C04B 35/195 |

OTHER PUBLICATIONS

WO-2005/097,703 (Kawasaki) Oct. 2005 (online machine translation), [Retrieved on Aug. 26, 2019]. Retrieved from: Espacenet (Year: 2005).*

JPWO-2005/097,703 (Tomita) Feb. 2008 (online machine translation), [Retrieved on Nov. 18, 2019]. Retrieved from: Espacenet (Year: 2008).*

International Search Report and Written Opinion (Application No. PCT/JP2017/006537) dated May 9, 2017.

* cited by examiner

MANUFACTURING METHOD OF HONEYCOMB STRUCTURE

BACKGROUND OF THE INVENTION

1. Field of the Invention

The present invention relates to a manufacturing method of a honeycomb structure, and more particularly, it relates to a manufacturing method of a honeycomb structure to manufacture the honeycomb structure which is capable of effectively inhibiting generation of defects such as cracks in a temperature range during degreasing or during firing and which is excellent in thermal shock resistance.

2. Description of Related Art

In various fields of chemistry, electric power, iron and steel, and others, a ceramic honeycomb structure has been employed as a carrier in a catalyst device for use in an environmental measure, collection of specific substances or the like. Furthermore, the ceramic honeycomb structure has also been used as an exhaust gas purifying filter. The ceramic honeycomb structure is excellent in heat resistance and corrosion resistance and is employed in the above-mentioned various use applications. The honeycomb structure is a structure having partition walls defining a plurality of cells which become through channels for a fluid and extend from one end face to the other end face.

As a manufacturing method of such a honeycomb structure, for example, there is disclosed a method of kneading a cordierite forming material, water, an organic binder and the like and extruding a forming raw material having an improved plasticity, followed by drying and firing, to manufacture the honeycomb structure (e.g., see Patent Document 1).

The organic binder imparts plasticity and shape retention to improve formability of the honeycomb structure, and the larger an amount of the binder to be added is, the more the formability improves. To form a large-sized structure and a complicated cell structure which have increasingly been demanded in recent years, a kneaded material suitable in formability is required, and as a result, a large amount of organic binder has to be added as compared with a case of manufacturing a honeycomb structure having a small size or a simple structure.

The organic binder in a ceramic formed body gels (i.e., causes syneresis) when the water is taken during the drying. Due to this gelation, the ceramic formed body hardens and its strength improves. However, the organic binder is burned down during the firing, and hence a mechanical strength of the structure deteriorates. Furthermore, a space occupied by the organic binder is easy to become a defect. Consequently, when the amount of the organic binder to be added increases, the mechanical strength of the obtained honeycomb structure might deteriorate. Furthermore, in the large-sized honeycomb structure, when the organic binder is burned during the firing, an inner portion of the structure easily reaches a high temperature due to burning heat. Consequently, due to thermal stress generated by a difference between the inner temperature of the honeycomb structure and an outer temperature thereof, defects such as cracks are easily generated, the mechanical strength of the honeycomb structure deteriorates, and additionally, yield noticeably decreases. Furthermore, during the firing, $CO_2$ and a toxic gas are generated and emitted to the atmospheric air by the burning of the organic binder, which has raised environmental problems such as air pollution and global warming.

To solve the above-mentioned problems, there is disclosed a technology of adding an inorganic binder and various types of forming aids to a forming raw material, thereby manufacturing a honeycomb structure in which generation of defects such as cracks is inhibited and high strength and low thermal expansion are maintained (e.g., see Patent Documents 2 and 3). Furthermore, there is also disclosed a technology of applying a predetermined electrolyte aqueous solution to at least a part of the surface of the ceramic formed body, thereby manufacturing a honeycomb structure having an improved strength without containing a large amount of organic binder or inorganic binder (e.g., see Patent Documents 4 and 5).

CITATION LIST

Patent Documents

[Patent Document 1] JP-A-2002-292616
[Patent Document 2] JP 4745963
[Patent Document 3] JP 5001892
[Patent Document 4] JP 5647051
[Patent Document 5] JP 5658067

SUMMARY OF THE INVENTION

Problem to be Solved by the Invention

In manufacturing methods described in Patent Documents 2 and 3, it is possible to obtain an effect of inhibiting generation of defects such as cracks, but there has been the problem that it is not possible to sufficiently obtain an effect of inhibiting generation of defects such as cracks due to a temperature difference or shrinkage difference between the surface of a formed body and an inner portion thereof in a temperature range during degreasing or during firing. In the manufacturing method described in Patent Document 2, there is used a forming raw material containing a cordierite forming material and an organic binder and additionally containing smectite in a state of a dispersion liquid in which smectite is beforehand dispersed in water. In Patent Document 2, an example of smectite is a clay mineral such as montmorillonite. When the forming raw material contains montmorillonite, there is a tendency that a thermal expansion coefficient of a honeycomb structure increases, and when montmorillonite is only added as smectite, a thermal shock resistance might deteriorate. Furthermore, in the manufacturing method described in Patent Document 2, it is possible to inhibit the generation of the defects of the cracks or the like to a certain degree, for example, by decreasing a temperature rise rate during the firing. However, such a method might cause another problem that manufacturing time and manufacturing cost of the honeycomb structure increase.

Furthermore, a clay mineral such as montmorillonite is a layered clay mineral having metal cations between layers. Hereinafter, the metal cations which are present between the layers of the clay mineral will be referred to as "interlayer metal cations" sometimes. Examples of the interlayer metal cations of montmorillonite include sodium ions and calcium ions. It is known that when the forming raw material contains the sodium ions or the calcium ions during the manufacturing of the honeycomb structure, the thermal shock resistance of the obtained honeycomb structure deteriorates. Here, in Patent Document 2, it has been suggested to use an ion-exchanged smectite in which interlayer cations of the sodium ions or the calcium ions are ion-exchanged with magnesium ions. However, there is a limit to an ion-exchange amount with the magnesium ions, and the ion-exchanged smectite still contains a certain amount or more of the sodium ions or the calcium ions. Therefore, the honeycomb structure manufactured by the manufacturing method described in Patent Document 2 has the problem that the thermal shock resistance is low.

Furthermore, a manufacturing method described in each of Patent Documents 4 and 5 includes a step of applying an electrolyte aqueous solution containing predetermined cations to the surface of a honeycomb formed body, and there has been the problem that the manufacturing method is laborious.

The present invention has been developed in view of the above-mentioned problems. An object of the present invention is to provide a manufacturing method of a honeycomb structure in which it is possible to effectively inhibit generation of defects such as cracks due to a temperature difference or a shrinkage difference between the surface of a formed body and an inner portion thereof in a temperature range during degreasing or during firing. Another object of the present invention is to provide a manufacturing method of a honeycomb structure in which it is possible to manufacture the honeycomb structure excellent in thermal shock resistance.

Means for Solving the Problem

According to the present invention, there is provided a manufacturing method of a honeycomb structure as follows.

According to a first aspect of the present invention, a manufacturing method of a honeycomb structure is provided including:

a forming step of preparing a forming raw material containing a cordierite forming material and an inorganic binder, and kneading and forming the prepared forming raw material, to prepare a formed body of a honeycomb shape; and a firing step of firing the prepared formed body of the honeycomb shape to obtain the honeycomb structure containing cordierite as a main component, wherein in the forming step, as the inorganic binder, smectite is used in which at least parts of interlayer metal cations are ion-exchanged with non-metal cations, in the smectite, a total amount of sodium to be contained in the smectite is 1.6 mass % or less in terms of oxides to 100 mass % of the smectite, and a content ratio of the smectite in the forming raw material is 0.5 parts by mass or more and 4.0 parts by mass or less to 100 parts by mass of the cordierite forming material.

According to a second aspect of the present invention, the manufacturing method of the honeycomb structure according to the above first aspect is provided, wherein as the smectite, a Na type smectite is used in which the interlayer metal cations are sodium ions.

According to a third aspect of the present invention, the manufacturing method of the honeycomb structure according to the above second aspect is provided, wherein as the smectite, an ion-exchanged smectite is used in which the non-metal cations are ammonium ions.

Effect of the Invention

According to a manufacturing method of a honeycomb structure of the present invention, it is possible to effectively inhibit generation of defects such as cracks due to a temperature difference or a shrinkage difference between the surface of a formed body and an inner portion thereof in a temperature range during degreasing or during firing. According to the manufacturing method of the honeycomb structure of the present invention, it is possible to manufacture the honeycomb structure which is excellent in thermal shock resistance. Furthermore, in the manufacturing method of the honeycomb structure of the present invention, generation of $CO_2$ and a toxic gas is prevented or decreased during the firing, thereby making it possible to prevent or inhibit environmental pollution and global warming.

DETAILED DESCRIPTION OF THE INVENTION

Hereinafter, an embodiment of the present invention will specifically be described. It should be understood that the present invention is not limited to the following embodiment and that the following embodiment to which changes, improvements and the like are added on the basis of ordinary knowledge of a person skilled in the art without departing from the gist of the present invention also falls in the scope of the present invention.

Figure 1:
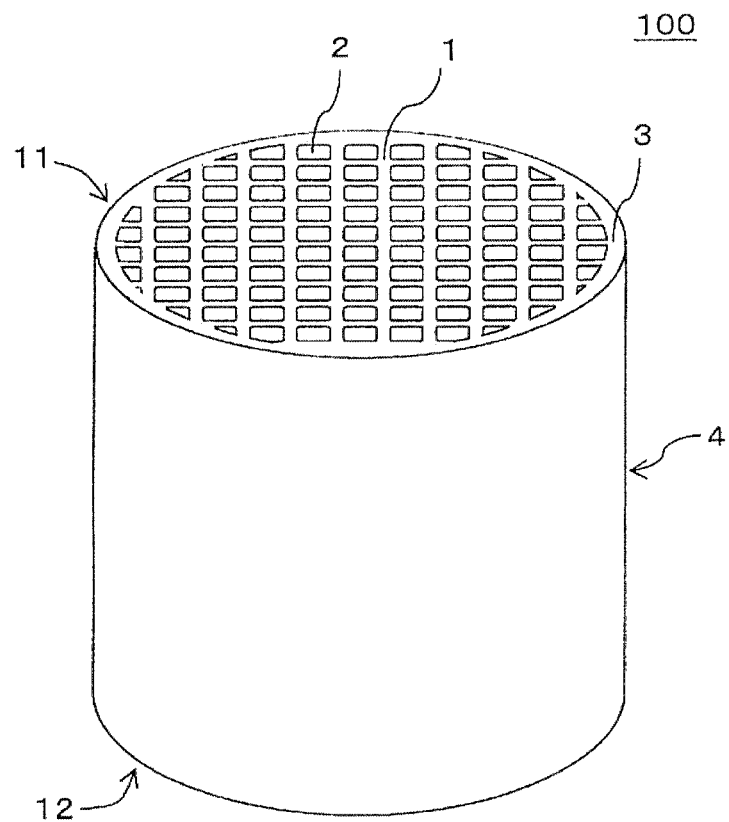
FIG. 1 is a perspective view schematically showing a honeycomb structure manufactured by one embodiment of a manufacturing method of the honeycomb structure of the present invention.
Figure 2:
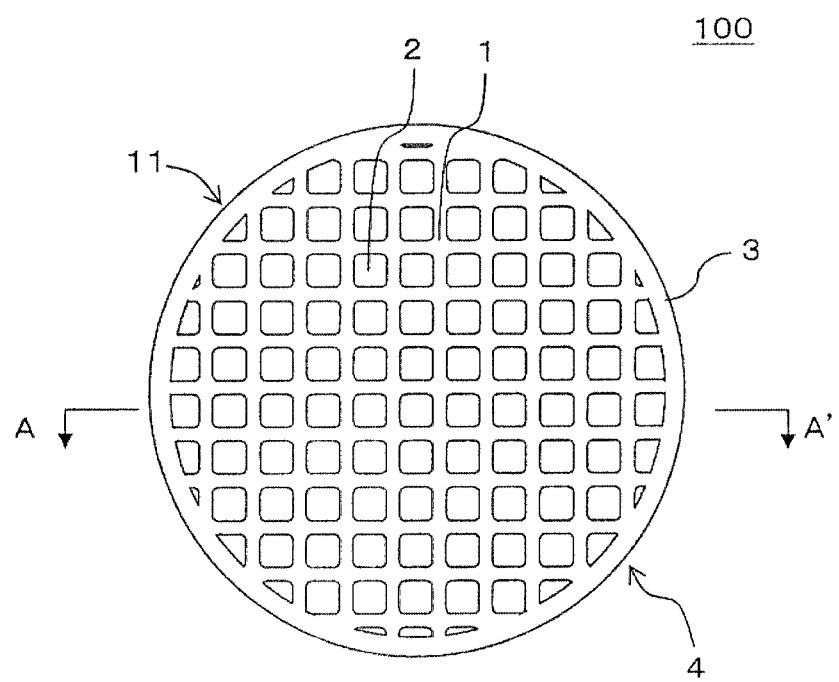
FIG. 2 is a schematic plan view in which the honeycomb structure shown in FIG. 1 is seen from the side of a first end face.
Figure 3:
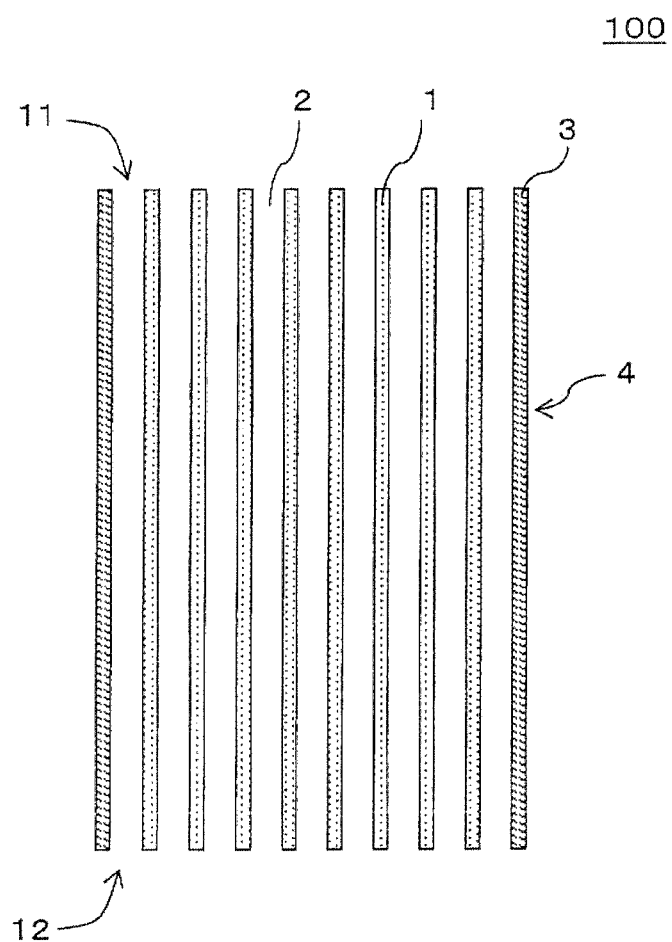
FIG. 3 is a schematic cross-sectional view showing a cross section taken along the A-A' line of FIG. 2.

One embodiment of a manufacturing method of a honeycomb structure of the present invention includes a forming step of preparing a formed body of a honeycomb shape, and a firing step of firing the prepared formed body of the honeycomb shape. Here, the honeycomb structure to be manufactured by the manufacturing method of the honeycomb structure of the present embodiment will be described with reference to FIG. 1 to FIG. 3. FIG. 1 is a perspective view schematically showing the honeycomb structure manufactured by one embodiment of the manufacturing method of the honeycomb structure of the present invention. FIG. 2 is a schematic plan view in which the honeycomb structure shown in FIG. 1 is seen from the side of a first end face. FIG. 3 is a schematic cross-sectional view showing a cross section taken along the A-A' line of FIG. 2.

As shown in FIG. 1 to FIG. 3, a honeycomb structure 100 is the honeycomb structure 100 including a pillar-shaped honeycomb structure body 4 having porous partition walls 1. In the honeycomb structure body 4, the partition walls 1 define a plurality of cells 2 extending from a first end face 11 to a second end face 12 of the honeycomb structure body 4. The honeycomb structure 100 shown in FIG. 1 to FIG. 3 further has a circumferential wall 3 positioned at an outermost circumference of the honeycomb structure body 4. A manufacturing method of the honeycomb structure of the present embodiment relates to a method of manufacturing the honeycomb structure 100. Hereinafter, the manufacturing method of the honeycomb structure of the present embodiment will simply be referred to as the manufacturing method of the present embodiment sometimes.

In the forming step of the manufacturing method of the present embodiment, first, a forming raw material containing a cordierite forming material and an inorganic binder is prepared. Afterward, the prepared forming raw material is kneaded and formed to prepare a formed body of a honeycomb shape. According to the manufacturing method of the present embodiment, in the forming step, as the inorganic binder, smectite is used in which at least parts of interlayer metal cations are ion-exchanged with non-metal cations. In this case, in the smectite, a total amount of sodium to be contained in the smectite is 1.6 mass % or less in terms of oxides to 100 mass % of the smectite. Furthermore, in the manufacturing method of the present embodiment, a content ratio of smectite in the forming raw material is 0.5 parts by mass or more and 4.0 parts by mass or less to 100 parts by mass of the cordierite forming material. The forming raw material may include components other than the cordierite forming material and the inorganic binder. Examples of the other components include an organic binder, water as a dispersing medium, a dispersing agent, and a pore former.

In the firing step of the manufacturing method of the present embodiment, the prepared formed body of the honeycomb shape is fired to obtain a honeycomb structure containing cordierite as a main component. In this way, it is possible to manufacture the honeycomb structure 100 shown in FIG. 1 to FIG. 3.

In the present specification, the smectite in which at least parts of the interlayer metal cations are ion-exchanged with the non-metal cations will be referred to as "an ion-exchanged smectite" sometimes. Furthermore, when a total amount of sodium to be contained in the ion-exchanged smectite is 1.6 mass % or less in terms of oxides to 100 mass % of the ion-exchanged smectite, the ion-exchanged smectite will be referred to as "a specific ion-exchanged smectite" sometimes. In the manufacturing method of the present embodiment, in the forming step, as the inorganic binder, the specific ion-exchanged smectite is used. Furthermore, in the forming step, it is important that a content ratio of smectite in the forming raw material is 0.5 parts by mass or more and 4.0 parts by mass or less to 100 parts by mass of the cordierite forming material. It is to be noted that in the manufacturing method of the present embodiment, a content ratio of the specific ion-exchanged smectite in the forming raw material is preferably 0.5 parts by mass or more and 4.0 parts by mass or less to 100 parts by mass of the cordierite forming material.

According to the manufacturing method of the honeycomb structure of the present embodiment, it is possible to effectively inhibit generation of defects such as cracks due to a temperature difference or a shrinkage difference between the surface of the formed body and an inner portion thereof in a temperature range during degreasing or during the firing. Furthermore, according to the manufacturing method of the honeycomb structure of the present embodiment, it is possible to manufacture the honeycomb structure which is excellent in thermal shock resistance. Furthermore, in the manufacturing method of the honeycomb structure of the present embodiment, generation of $CO_2$ and a toxic gas is prevented or decreased during the firing, thereby making it possible to prevent or inhibit environmental pollution and global warming.

Smectite is a generic name of a clay mineral having swelling properties. Especially, in the present specification, smectite is a layered clay mineral having metal cations between layers. Hereinafter, the metal cations which are present between the layers of the clay mineral will be referred to as "the interlayer metal cations". Smectite which is such a layered clay mineral functions as a binder in the forming raw material. For example, in the formed body obtained by extruding the forming raw material, it is considered that the layered clay mineral is disposed to lie on top of one another in the formed body, thereby contributing to maintenance of the shape of the formed body. By use of such smectite as the inorganic binder, it is possible to decrease an amount of the organic binder and to prevent or decrease the generation of $CO_2$ and the toxic gas during the firing as compared with a case of only using the organic binder.

As described above, smectite is the layered clay mineral, and smectite which is present as a natural substance includes sodium ions or calcium ions as the interlayer metal cations. When using smectite which is such a natural substance, sodium is present as impurities in cordierite constituting the honeycomb structure which is a final product. When sodium is mixed as the impurities in cordierite constituting the honeycomb structure, low thermal expansion which is a characteristic of cordierite might be disturbed. Heretofore, there has been suggested a technology of ion-exchanging the sodium ions included in smectite with magnesium ions. However, there is a limit to an ion exchange amount with the magnesium ions, and smectite in which the ions are exchanged with the magnesium ions still include a constant amount or more of the sodium ions, which might disturb the low thermal expansion.

In the manufacturing method of the present embodiment, the ion-exchanged smectite is used in which at least parts of the interlayer metal cations are ion-exchanged with the non-metal cations. Especially in the manufacturing method of the present embodiment, as the ion-exchanged smectite, the specific ion-exchanged smectite is used in which the total amount of sodium to be contained in the ion-exchanged smectite is 1.6 mass % or less in terms of oxides to 100 mass % of the ion-exchanged smectite. Here, in natural smectite, the total amount of sodium to be contained in the smectite is in excess of 1.6 mass % in terms of oxides to 100 mass % of the smectite. Furthermore, as to smectite in which the ions of the natural smectite are ion-exchanged with the magnesium ions, there is a limit to an ion exchange amount with the magnesium ions, and it might not be possible to sufficiently decrease the total amount of sodium. On the other hand, the non-metal cations can be ion-exchanged with a larger part of the interlayer metal cations, and for example, it is possible to prepare the ion-exchanged smectite in which the interlayer metal cations in excess of 99% are ion-exchanged. The manufacturing method of the present embodiment may include a step of preparing "a specific ion-exchanged smectite" used in the forming step. That is, the manufacturing method of the present embodiment may include a step of ion-exchanging the interlayer metal cations of smectite with various non-metal cations.

When the total amount of sodium to be contained in the ion-exchanged smectite is in excess of 1.6 mass % in terms of oxides to 100 mass % of the ion-exchanged smectite, the amount of sodium in the formed body increases, and the thermal shock resistance of cordierite deteriorates. As a result, a thermal expansion coefficient of the obtained honeycomb structure increases. The total amount of sodium to be contained in the ion-exchanged smectite is preferably 1.6 mass % or less in terms of oxides, further preferably 1.0 mass % or less in terms of oxides, and especially preferably 0.5 mass % or less in terms of oxides to 100 mass % of the ion-exchanged smectite. The ion-exchanged smectite does not have to contain sodium. That is, the total amount of sodium in the ion-exchanged smectite may be a detection limit or less of a measuring device. An example of a detection limit value of the measuring device to measure the amount of sodium in the ion-exchanged smectite is 0.01 mass %.

A ratio of the total amount of sodium to be contained in the ion-exchanged smectite is obtainable by performing measurement in conformity with "methods for X-ray fluorescence spectrometric analysis of refractory products" of JIS R 2216.

When a content ratio of smectite in the forming raw material is smaller than 0.5 parts by mass to 100 parts by mass of the cordierite forming material, the amount of the inorganic binder decreases, and it might be difficult to maintain the shape of the formed body. Furthermore, when the amount of the organic binder increases to maintain the shape of the formed body, an amount of $CO_2$ or the toxic gas to be generated might increase. When the content ratio of smectite is in excess of 4.0 parts by mass to 100 parts by mass of the cordierite forming material, the thermal expansion coefficient of the honeycomb structure might increase. The content ratio of smectite in the forming raw material is preferably 0.5 parts by mass or more, further preferably 0.7 parts by mass or more, and especially preferably 1.0 part by mass or more to 100 parts by mass of the cordierite forming material. The content ratio of smectite in the forming raw material is preferably 4.0 parts by mass or less, further preferably 3.0 parts by mass or less, and especially preferably 2.0 parts by mass or less to 100 parts by mass of the cordierite forming material. Especially, in the honeycomb structure of the present embodiment, the above-mentioned "content ratio of smectite" is more preferably "a content ratio of the specific ion-exchanged smectite".

The cordierite forming material becomes the main component of the forming raw material. In the forming step, the forming raw material containing the cordierite forming material and the inorganic binder is kneaded and this forming raw material is obtained as a kneaded material. The forming raw material may contain the organic binder. Such a kneaded material is formed to prepare the formed body of the honeycomb shape. Hereinafter, the formed body of the honeycomb shape will be referred to as "the honeycomb formed body" sometimes. The cordierite forming material becomes cordierite which is a main component of the partition walls after the honeycomb formed body is fired. An example of the cordierite forming material is an oxide, a hydroxide or a carbonate containing at least one selected from the group consisting of magnesium, aluminum and silicon. The examples of the cordierite forming material include talc, kaolin, alumina, aluminum hydroxide, silica, and magnesia.

A content ratio of the cordierite forming material is preferably from 94.8 to 99.4 mass % to a total mass of the cordierite forming material, the inorganic binder, and the organic binder which is contained as required. When the content ratio is smaller than 94.8 mass %, a problem might occur in the aspect of thermal expansion or strength of the honeycomb structure, and when the content ratio is in excess of 99.4 mass %, it might be difficult to form the honeycomb shape. The content ratio of the cordierite forming material is further preferably from 95.5 to 99.2 mass % and especially preferably from 96.1 to 99.0 mass % to the total mass of the cordierite forming material, the inorganic binder and the organic binder.

The organic binder improves plasticity and formability of the kneaded material obtained by kneading the forming raw material, and also performs a function of a shape holding agent to hold the shape of the formed body. On the other hand, the organic binder becomes a generation source of $CO_2$ or the toxic gas during the firing. Consequently, when the formed body including a large amount of organic binder is fired to manufacture the honeycomb structure, there is the possibility of promoting the environmental pollution or the global warming. Furthermore, as to the organic binder during the forming, a space occupied by the organic binder might become a defect. In consequence, defects such as cracks might be generated in the obtained honeycomb structure or the strength of the obtained honeycomb structure might deteriorate. Therefore, it is necessary to minimize the amount of the organic binder to be included in the forming raw material. In the manufacturing method of the present embodiment, a content ratio of the organic binder is preferably 5 parts by mass or less and further preferably 4 parts by mass or less to 100 parts by mass of a total of the cordierite forming material, the inorganic binder and the organic binder. Furthermore, depending on use applications, the forming raw material does not have to contain the organic binder. That is, a lower limit value of the content ratio of the organic binder may be 0 part by mass.

An example of the organic binder is an organic polymer. Specifically, examples of the organic binder include hydroxypropoxyl methylcellulose, hydroxypropyl methylcellulose, methylcellulose, hydroxyethyl cellulose, carboxyl methylcellulose, and polyvinyl alcohol. One type of organic binder alone or a combination of two or more types of organic binders is usable.

An example of smectite is the layered clay mineral having a structure to hold ions of alkali metal or alkali earth metal between the layers. Especially, smectite means a clay mineral group having a structure in which a sheet obtained by vertically sandwiching an octahedron layer between tetrahedron layers is defined as one unit and the above-mentioned ions are held between the layers. An example of the octahedron layer is a layer containing aluminum (Al) or magnesium (Mg) and oxygen (O). An example of the tetrahedron layer is a layer containing silicon (Si) or aluminum (Al) and oxygen (O). Examples of smectite include montmorillonite, hectorite, and saponite. Furthermore, a clay containing a large amount of montmorillonite is generally referred to as bentonite sometimes. In the manufacturing method of the present embodiment, one type of smectite alone or a combination of two or more types of smectite may be used as the inorganic binder.

In the manufacturing method of the present embodiment, as smectite, the ion-exchanged smectite is used in which the interlayer metal cations are ion-exchanged with the non-metal cations. An example of the non-metal cation is an ammonium ion. Furthermore, examples of an organic salt to enable the ion exchange of the interlayer metal cations of smectite with the non-metal cations include the following organic salts: quaternary ammonium salts such as dimethyldistearyl ammonium salt and trimethylstearyl ammonium salt; a phosphonium salt; and imidazolium salt. Furthermore, the following organic molecules behave cations by protonation at low pH, and are therefore usable as substances to ion-exchange the interlayer metal cations of smectite with the non-metal cations. Examples of the organic molecules include triazine herbicides such as atrazine, cyanazine and simazine, an N-heterocyclic compound of quinolone or the like, ammonia, aniline which becomes a raw material of a dyestuff or a synthetic resin, pyridine, and urea.

In the present invention, "non-metal" means inorganic and organic substances other than metals. Therefore, examples of "non-metal cations" are cations which are conjugate acids of inorganic substances other than metals, and cations obtained from organic substances from which anions are freed. Also, "non-metal cations" may be hydrogen ions. However, as the "non-metal cations" which ion-exchange with the interlayer metal cations, non-metal cations other than hydrogen ions are preferable.

Here, there is described a method of ion-exchanging the interlayer metal cations of smectite with the non-metal cations. In the following method, there will be described an example of a case where montmorillonite is used as smectite and the non-metal cations to perform the ion exchange are the ammonium ions. First, in a 1N ammonium chloride aqueous solution, montmorillonite is well stirred, dispersed, and left to stand for 24 hours. Next, when particles of montmorillonite precipitate, its supernatant liquid is removed, and the 1 N ammonium chloride aqueous solution is newly added. Further, a hitherto described operation is repeatedly performed three times. That is, the stirring, the standing for 24 hours, the removal of the supernatant liquid and the newly adding of the ammonium chloride aqueous solution are repeatedly performed three times. Next, a solution subjected to the above operations repeated three times (a montmorillonite-containing solution) is centrifugally separated into montmorillonite and the ammonium chloride aqueous solution. Next, distilled water is added to wash the separated montmorillonite. The washing is repeated 10 times, and then montmorillonite which is a sample is placed in a dialysis membrane and impregnated into the distilled water. The distilled water is changed to perform the washing until chlorine ions in the distilled water are not detected any more. The montmorillonite obtained in this manner becomes montmorillonite in which the interlayer metal cations are ion-exchanged with the ammonium ions. According to such a method, it is possible to suitably obtain the ion-exchanged smectite in which the total amount of sodium to be contained in smectite of montmorillonite or the like is remarkably small. It is to be noted that 1 N means 1 normality, and 1 normality means a solution of 1 g of solute to 1 L of water.

In the manufacturing method of the present embodiment, it is preferable that smectite is used in a state of a dispersion liquid in which smectite is beforehand dispersed in water, because even a small amount of smectite in this state can effectively impart plasticity and formability to the kneaded material. That is, when smectite is used in the state of the dispersion liquid in which smectite is dispersed in water, the water enters into a space between the layers of smectite, and the layers are dissociated separately into pieces. Further, smectite swells, its viscosity gradually increases, and the dispersion liquid becomes jelly. In this state, smectite is added to the forming raw material, so that even a substantially small amount of smectite can sufficiently develop the plasticity and formability in the kneaded material.

In the manufacturing method of the present embodiment, it is preferable that as smectite prior to the ion exchange, a Na type smectite or a Ca type smectite is used in which the interlayer cations are sodium ions or calcium ions. Furthermore, it is more preferable that as smectite prior to the ion exchange, the Na type smectite is used in which the interlayer metal cations are the sodium ions.

In the manufacturing method of the present embodiment, the forming raw material may further contain a pore former. Such a pore former becomes a casting mold for pores, and the pores having a desirable shape, size and distribution can be formed in the honeycomb structure to increase a porosity, so that the honeycomb structure having a high porosity is obtainable. Examples of the pore former include graphite, flour, starch, a phenol resin, polymethyl methacrylate, polyethylene, polyethylene terephthalate, and a foamable resin. An example of the foamable resin is acrylonitrile based plastic balloon. These pore formers form the pores, but instead, the pore formers burn themselves, and hence above all, the foamable resin is preferable from the viewpoint of inhibiting the generation of $CO_2$ and the toxic gas and the generation of the cracks. It is to be noted that in a case of using the pore former, a total of the content ratios of the organic binder and the pore former is preferably 5 parts by mass or less and further preferably 4 parts by mass or less to 100 parts by mass of the forming raw material.

For a ratio of water to be contained as the dispersing medium, it is preferable to adjust an amount of the water so that the kneaded material during the forming has an appropriate hardness.

There is not any special restriction on a method of kneading the forming raw material to obtain the kneaded material, and an example of the method is a method of using a kneader, a vacuum pugmill or the like.

In the forming step, the kneaded material obtained by kneading the forming raw material is formed to prepare the honeycomb formed body. The obtained honeycomb formed body may be dried to obtain a honeycomb dried body of the dried honeycomb formed body.

There is not any special restriction on a shape of the honeycomb formed body, and an example of the shape is a honeycomb formed body in which partition walls of a honeycomb shape define a plurality of cells extending from a first end face that is one end face to a second end face that is the other end face. In a case of using the honeycomb structure in a use application of a filter such as a DPF, it is preferable that one of end portions of each cell is plugged with a plugging portion. It is to be noted that the DPF is an abbreviation for "a diesel particulate filter". There is not any special restriction on the whole shape of the honeycomb formed body, and examples of the shape include a round pillar shape, a quadrangular prismatic columnar shape, and a triangular prismatic columnar shape. Furthermore, there is not any special restriction on a cell shape of the honeycomb formed body, and examples of the cell shape include a quadrangular shape, a hexagonal shape and a triangular shape. The cell shape is a shape of the cells in a cross section of the honeycomb structure which is perpendicular to a cell extending direction.

There is not any special restriction on a method of forming the honeycomb formed body, and a heretofore known forming method of extrusion, injection molding or press molding is usable. Above all, a suitable example of the method is a method of extruding the kneaded material prepared as described above by use of a die having a desirable cell shape, partition wall thickness, and cell density. There is also not any special restriction on a drying method, and it is possible to use a heretofore known drying method of hot air drying, microwave drying, induction heating, decompression drying, vacuum drying, freeze drying or the like. Above all, a drying method obtained by combining the hot air drying with the microwave drying or the induction drying is preferable in that the whole formed body can immediately and uniformly be dried.

Next, in the firing step, the honeycomb formed body obtained as described above may be calcinated to obtain a calcinated body. The calcinating means an operation of burning and removing organic substances in the formed body. The calcinating is referred to as "degreasing" sometimes. Examples of the organic substances in the formed body include a binder, a dispersing agent and a pore former. In general, a burning temperature of the organic binder is from about 100 to 300° C. and a burning temperature of the pore former is from about 200 to 800° C. Consequently, a calcinating temperature may be from about 200 to 1000° C. There is not any special restriction on calcinating time, but the calcinating time is usually from about 1 to 10 hours.

The calcinated body obtained as described above is fired to obtain the honeycomb structure. For the purpose of distinguishing the firing from the calcinating, the firing is referred to as main firing sometimes. The main firing means an operation of sintering and densifying the forming raw material in the formed body or the calcinated body to acquire a predetermined strength. Firing conditions such as firing temperature and firing time vary with a type of forming raw material, and hence appropriate conditions may be selected in accordance with the type. In the manufacturing method of the present embodiment, it is preferable that the honeycomb formed body is fired at 1300 to 1500° C. It is further preferable that the honeycomb formed body is fired at 1350 to 1450° C. When the firing temperature is lower than 1300° C., a target crystal phase (cordierite) cannot be obtained sometimes, and when the firing temperature is in excess of 1500° C., the honeycomb formed body might melt.

The honeycomb structure manufactured by the manufacturing method of the present embodiment is a high-quality structure which has less defects or cracks, maintains a high strength and low thermal expansion properties, and contains cordierite as a main component. An example of a suitable composition of cordierite is $2MgO \cdot 2Al_2O_3 \cdot 5SiO_2$.

EXAMPLES

Hereinafter, the present invention will further specifically be described in accordance with examples, but the present invention is not limited to these examples at all.

Example 1

In Example 1, first, by the following method, a forming raw material was prepared. First, as a cordierite forming material, talc, kaolin, alumina, aluminum hydroxide and silica were prepared. An organic binder and an inorganic binder were added to this cordierite forming material. As the organic binder, methylcellulose was used. As the inorganic binder, montmorillonite was used in which at least parts of interlayer metal cations were ion-exchanged with amine ions. Montmorillonite is one type of smectite. Hereinafter, montmorillonite in which at least parts of the interlayer metal cations are ion-exchanged with the amine ions will be referred to as "an amine-substituted montmorillonite" sometimes. In the amine-substituted montmorillonite used in Example 1, a total amount of sodium to be contained in the amine-substituted montmorillonite was 1.58 mass % in terms of oxides to 100 mass % of the amine-substituted montmorillonite. Table 1 shows a chemical composition (mass %) of smectite used as the inorganic binder. It is to be noted that "amine" is a generic name of ammonia and compounds in which one or more hydrogen atoms of ammonia are substituted with hydrocarbon groups or aromatic atom groups. The "amine ions" are cations in which one hydrogen ion is added to the above-mentioned compounds. In Example 1, the amine ions which were ion-exchanged with the interlayer metal cations are ammonium ions.

A chemical composition (mass %) of smectite used as the inorganic binder was measured by using a simultaneous elemental measurement type X-ray fluorescence spectrometer. As the spectrometer, "PW2606/10 (tradename)" manufactured by PHILIPS was used.

A content ratio of the amine-substituted montmorillonite in the forming raw material was set to 4.0 parts by mass to 100 parts by mass of the cordierite forming material, and amounts of talc, kaolin, alumina, aluminum hydroxide and silica in the cordierite forming material were suitably adjusted so that the composition became close to a cordierite composition. Table 1 shows a ratio of a mass of smectite to 100 parts by mass of the cordierite forming material in a column of "content ratio (parts by mass) of smectite".

A content ratio of methylcellulose in the forming raw material was set to 4 parts by mass to 100 parts by mass of a total of the cordierite forming material and the amine-substituted montmorillonite. Furthermore, a surfactant and water were further added to the forming raw material. 1 part by mass of the surfactant was added to 100 parts by mass of the forming raw material. 37 parts by mass of water was added to 100 parts by mass of the forming raw material. The forming raw material to which the surfactant and water were added was kneaded, thereby obtaining a compact of a kneaded material.

The obtained kneaded material was formed into a honeycomb shape in an extruder, thereby obtaining a honeycomb formed body. During the forming, the honeycomb formed body was suitably formable without causing clogging of a die of the extruder or generating forming defects.

Next, the obtained honeycomb formed body was dried with microwaves and hot air, and then at 1420° C. of an atmospheric temperature, the dried body was fired for 7 hours to manufacture a honeycomb structure. In each of examples and comparative examples, 10 honeycomb structures were prepared, and it was confirmed whether or not a crack defect was present in each end face of each honeycomb structure. Table 1 shows the evaluation result of the crack defect in the end face of the honeycomb structure in a column of "evaluation of crack defect during firing". In the evaluation result shown in Table 1, "0/10" indicates that the number of the crack defects in the 10 honeycomb structures was 0. For example, in a case where the number of the crack defects is 1, the table shows "1/10". In the honeycomb structure of Example 1, any crack defects were not confirmed in the end faces.

Furthermore, a thermal expansion coefficient of the obtained honeycomb structure was measured. The thermal expansion coefficient of the honeycomb structure of Example 1 was $0.62 \times 10^{-6}$ 1° C. Table 1 shows a value of the thermal expansion coefficient of the honeycomb structure in a column of "thermal expansion coefficient ($\times 10^{-6}$1° C.)". The thermal expansion coefficient of the honeycomb structure was measured with "Thermo plus TG8120 (tradename)" manufactured by Rigaku Corporation.

Furthermore, there was obtained a total amount (mass %) of $Na_2O$ which was derived from smectite and was to be contained in the obtained honeycomb structure. In the honeycomb structure of Example 1, the total amount of $Na_2O$ derived from smectite was 0.06 mass %, and it has been supposed that a bad influence by $Na_2O$ derived from smectite was remarkably little. Table 1 shows a value of the total amount of $Na_2O$ derived from smectite in a column of "total amount (mass %) of $Na_2O$ derived from smectite".

TABLE 1

| Chemical composition (mass %) of smectite | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Ignition loss (Igloss) | 5.69 | 6.65 | 8.24 | 5.94 | 6.89 | 7.24 | 23.66 | 6.73 | 6.73 | 7.50 | 7.50 |
| $SiO_2$ | 68.68 | 67.08 | 63.60 | 69.72 | 69.94 | 69.10 | 43.40 | 68.10 | 68.10 | 67.60 | 67.60 |
| $Al_2O_3$ | 16.72 | 13.78 | 21.67 | 16.99 | 16.44 | 17.02 | 3.81 | 17.80 | 17.80 | 17.20 | 17.20 |
| $Fe_2O_3$ | 3.58 | 2.43 | 2.55 | 3.66 | 1.97 | 2.01 | 1.55 | 4.50 | 4.50 | 2.30 | 2.30 |
| $TiO_2$ | 0.12 | 0.17 | 0.19 | 0.12 | 0.07 | 0.07 | 0.27 | 0.11 | 0.11 | 0.07 | 0.07 |
| CaO | 0.98 | 0.70 | 0.12 | 0.49 | 0.16 | 0.15 | 6.74 | 0.07 | 0.07 | 0.03 | 0.03 |
| MgO | 1.80 | 7.46 | 3.58 | 1.65 | 4.04 | 4.22 | 19.00 | 1.93 | 1.93 | 4.80 | 4.80 |
| $K_2O$ | 0.23 | 0.42 | 0.065 | 0.22 | 0.52 | 0.43 | 0.73 | 0.16 | 0.16 | 0.38 | 0.38 |
| $Na_2O$ | 1.58 | 0.97 | 0.21 | 0.18 | 0.04 | 0.02 | 0.76 | 0.07 | 0.07 | 0.02 | 0.02 |
| Content ratio (part by mass) of smectite | 4.0 | 4.0 | 3.2 | 3.3 | 4.0 | 3.3 | 4.0 | 0.5 | 1.0 | 0.5 | 0.5 |
| Total amount (mass %) of $Na_2O$ derived from smectite | 0.06 | 0.04 | 0.01 | 0.01 | 0.00 | 0.00 | 0.03 | 0.00 | 0.00 | 0.00 | 0.00 |
| Thermal expansion coefficient ($\times 10^{-6}/°$ C.) | 0.62 | 0.59 | 0.50 | 0.50 | 0.49 | 0.49 | 0.57 | 0.50 | 0.51 | 0.49 | 0.50 |
| Evaluation of crack defect during firing | 0/10 | 0/10 | 0/10 | 0/10 | 0/10 | 0/10 | 0/10 | 0/10 | 0/10 | 0/10 | 0/10 |

Examples 2 to 6 and 8 to 11

In each of Examples 2 to 6 and 8 to 11, an amine-substituted montmorillonite of such a chemical composition as shown in Table 1 was used. Further, a content ratio of the amine-substituted montmorillonite in a forming raw material was changed as shown in Table 1, and amounts of talc, kaolin, alumina, aluminum hydroxide and silica in a cordierite forming material were suitably adjusted so that the composition became close to a cordierite composition. As to a manufacturing method other than this method, the procedure of Example 1 was repeated to manufacture 10 honeycomb structures. As to each obtained honeycomb structure, evaluation of crack defects during firing and measurement of a thermal expansion coefficient were carried out. Table 1 shows the results.

Example 7

In Example 7, first, by the following method, a forming raw material was prepared. As a cordierite forming material, talc, kaolin, alumina, aluminum hydroxide and silica were prepared. An organic binder and an inorganic binder were added to this cordierite forming material. As the organic binder, methylcellulose was used. As the inorganic binder, hectorite was used in which at least parts of interlayer metal cations were ion-exchanged with amine ions. Hectorite is one type of smectite. Hereinafter, hectorite in which at least parts of the interlayer metal cations are ion-exchanged with the amine ions will be referred to as "an amine-substituted hectorite" sometimes. In the amine-substituted hectorite used in Example 7, a total amount of sodium to be contained in the amine-substituted hectorite was 0.76 mass % in terms of oxides to 100 mass % of the amine-substituted hectorite. Table 1 shows a chemical composition (mass %) of smectite used as the inorganic binder.

A content ratio of the amine-substituted hectorite in the forming raw material was set to 4.0 parts by mass to 100 parts by mass of the cordierite forming material, and amounts of talc, kaolin, alumina, aluminum hydroxide and silica in the cordierite forming material were suitably adjusted so that the composition became close to a cordierite composition. Table 1 shows a ratio of a mass of smectite to 100 parts by mass of the cordierite forming material in a column of "content ratio (parts by mass) of smectite".

A content ratio of methylcellulose in the forming raw material was set to 4 parts by mass to 100 parts by mass of a total of the cordierite forming material and the amine-substituted hectorite. Furthermore, a surfactant and water were further added to the forming raw material. 1 part by mass of the surfactant was added to 100 parts by mass of the forming raw material. 37 parts by mass of water was added to 100 parts by mass of the forming raw material. The forming raw material to which the surfactant and water were added was kneaded, thereby obtaining a compact of a kneaded material.

The obtained kneaded material was formed into a honeycomb shape in an extruder, thereby obtaining a honeycomb formed body. During the forming, the honeycomb formed body was suitably formable without causing clogging of a die of the extruder or generating forming defects.

Next, the obtained honeycomb formed body was dried with microwaves and hot air, and then at 1420° C. of an atmospheric temperature, the dried body was fired for 7 hours to manufacture 10 honeycomb structures. As to each obtained honeycomb structure, evaluation of crack defects during firing and measurement of a thermal expansion coefficient were carried out. Table 1 shows the result.

Furthermore, there was obtained a total amount (mass %) of $Na_2O$ which was derived from smectite and was to be contained in the obtained honeycomb structure. In the honeycomb structure of Example 7, the total amount of $Na_2O$ derived from smectite was 0.03 mass %, and it has been supposed that a bad influence by $Na_2O$ derived from smectite was remarkably little. Table 1 shows a value of the total amount of $Na_2O$ derived from smectite in a column of "total amount (mass %) of $Na_2O$ derived from smectite".

Comparative Example 1

In Comparative Example 1, first, by the following method, a forming raw material was prepared. As a cordierite forming material, talc, kaolin, alumina, aluminum hydroxide and silica were prepared. An organic binder was added to this cordierite forming material. As the organic binder, methylcellulose was used. As to a content ratio of each component of the cordierite forming material, amounts of talc, kaolin, alumina, aluminum hydroxide and silica were adjusted so that a composition became close to a cordierite composition.

A content ratio of methylcellulose in the forming raw material was set to 4 parts by mass to 100 parts by mass of the cordierite forming material. Furthermore, a surfactant and water were further added to the forming raw material. 1 part by mass of the surfactant was added to 100 parts by mass of the forming raw material. 37 parts by mass of water was added to 100 parts by mass of the forming raw material. The forming raw material to which the surfactant and water were added was kneaded, thereby obtaining a compact of a kneaded material.

The obtained kneaded material was formed into a honeycomb shape in an extruder, thereby obtaining a honeycomb formed body. During the forming, the honeycomb formed body was suitably formable without causing clogging of a die of the extruder or generating forming defects.

Next, the obtained honeycomb formed body was dried with microwaves and hot air, and then at 1420° C. of an atmospheric temperature, the dried body was fired for 7 hours to manufacture 10 honeycomb structures. As to each obtained honeycomb structure, evaluation of crack defects during firing and measurement of a thermal expansion coefficient were carried out. Table 2 shows the result. The thermal expansion coefficient of the honeycomb structure of Comparative Example 1 was $0.49 \times 10^{-6}$/° C., and it was possible to manufacture the honeycomb structure having a low thermal expansion coefficient. However, in the honeycomb structure of Comparative Example 1, crack defects were confirmed in all of the 10 prepared honeycomb structures.

Comparative Example 2

In Comparative Example 2, first, by the following method, a forming raw material was prepared. As a cordierite forming material, talc, kaolin, alumina, aluminum hydroxide and silica were prepared. An organic binder and an inorganic binder were added to this cordierite forming material. As the organic binder, methylcellulose was used. As the inorganic binder, a Na type montmorillonite was used. In the Na type montmorillonite used in Comparative Example 2, a total amount of sodium to be contained in the Na type montmorillonite was 3.25 mass % in terms of oxides to 100 mass % of the Na type montmorillonite. Table 2 shows a chemical composition (mass %) of smectite used as the inorganic binder.

A content ratio of the Na type montmorillonite in the forming raw material was set to 2.0 parts by mass to 100 parts by mass of the cordierite forming material, and amounts of talc, kaolin, alumina, aluminum hydroxide and silica in the cordierite forming material were suitably adjusted so that the composition became close to a cordierite composition. Table 2 shows a ratio of a mass of smectite to 100 parts by mass of the cordierite forming material in a column of "content ratio (parts by mass) of smectite".

In Comparative Example 2, the procedure of Example 1 was repeated except that the Na type montmorillonite was used as the inorganic binder as described above, to manufacture 10 honeycomb structures. As to each obtained honeycomb structure, evaluation of crack defects during firing and measurement of a thermal expansion coefficient were carried out. Table 2 shows the result. In the honeycomb structure of Comparative Example 2, any crack defects were not confirmed in end faces. However, the thermal expansion coefficient of the honeycomb structure of Comparative Example 2 was $0.67 \times 10^{-6}$/° C., and an increase of the thermal expansion coefficient was confirmed as compared with honeycomb structures of Examples 1 to 11.

Comparative Examples 3 and 4

In each of Comparative Examples 3 and 4, there was used an amine-substituted montmorillonite of such a chemical composition as shown in Table 2. Further, a content ratio of the amine-substituted montmorillonite in a forming raw material was changed as shown in Table 2, and amounts of talc, kaolin, alumina, aluminum hydroxide and silica in a

TABLE 2

| Chemical composition (mass %) of smectite | Comparative Example 1 | Comparative Example 2 | Comparative Example 3 | Comparative Example 4 | Comparative Example 5 | Comparative Example 6 |
|---|---|---|---|---|---|---|
| Ignition loss (Igloss) | — | 5.94 | 6.27 | 5.78 | 7.99 | 7.99 |
| $SiO_2$ | — | 61.69 | 63.76 | 68.03 | 60.63 | 60.63 |
| $Al_2O_3$ | — | 21.28 | 19.48 | 16.00 | 5.67 | 5.67 |
| $Fe_2O_3$ | — | 2.13 | 3.33 | 2.02 | 2.08 | 2.08 |
| $TiO_2$ | — | 0.13 | 0.14 | 0.07 | 0.42 | 0.42 |
| CaO | — | 0.55 | 0.93 | 0.89 | 1.26 | 1.26 |
| MgO | — | 3.92 | 2.53 | 4.02 | 20.13 | 20.13 |
| $K_2O$ | — | 0.17 | 0.23 | 0.51 | 0.42 | 0.42 |
| $Na_2O$ | — | 3.25 | 2.45 | 2.23 | 1.43 | 1.43 |
| Content ratio (part by mass) of smectite | — | 2.0 | 4.0 | 3.0 | 6.0 | 4.0 |
| Total amount (mass %) of $Na_2O$ derived from smectite | — | 0.07 | 0.10 | 0.07 | 0.09 | 0.06 |
| Thermal expansion coefficient ($\times 10^{-6}$/° C.) | 0.49 | 0.67 | 0.75 | 0.71 | 0.73 | 0.61 |
| Evaluation of crack defect during firing | 10/10 | 0/10 | 0/10 | 0/10 | 0/10 | 10/10 | cordierite forming material were suitably adjusted so that the composition became close to a cordierite composition. As to a manufacturing method other than this method, the procedure of Example 1 was repeated to manufacture 10 honeycomb structures. As to each obtained honeycomb structure, evaluation of crack defects during firing and measurement of a thermal expansion coefficient were carried out. Table 2 shows the results. In the amine-substituted montmorillonite used in Comparative Example 3, a total amount of sodium to be contained in the amine-substituted montmorillonite was 2.45 mass % in terms of oxides to 100 mass % of the amine-substituted montmorillonite. In the amine-substituted montmorillonite used in Comparative Example 4, a total amount of sodium to be contained in the amine-substituted montmorillonite was 2.23 mass % in terms of oxides to 100 mass % of the amine-substituted montmorillonite. In each honeycomb structure of Comparative Examples 3 and 4, any crack defects were not confirmed in end faces. However, the thermal expansion coefficient of the honeycomb structure of Comparative Example 3 was $0.75 \times 10^{-6}/°$ C., and an increase of the thermal expansion coefficient was confirmed as compared with the honeycomb structures of Examples 1 to 11. Similarly, the thermal expansion coefficient of the honeycomb structure of Comparative Example 4 was $0.71 \times 10^{-6}/°$ C., and an increase of the thermal expansion coefficient was confirmed as compared with the honeycomb structures of Examples 1 to 11.

Comparative Examples 5 and 6

In each of Comparative Examples 5 and 6, first, by the following method, a forming raw material was prepared. As a cordierite forming material, talc, kaolin, alumina, aluminum hydroxide and silica were prepared. An organic binder and an inorganic binder were added to this cordierite forming material. As the organic binder, methylcellulose was used. As the inorganic binder, montmorillonite was used in which at least parts of interlayer metal cations were ion-exchanged with magnesium ions. Hereinafter, montmorillonite in which at least parts of the interlayer metal cations are ion-exchanged with the magnesium ions will be referred to as "a magnesium-substituted montmorillonite" sometimes. In the magnesium-substituted montmorillonite used in Comparative Examples 5 and 6, a total amount of sodium to be contained in the magnesium-substituted montmorillonite was 1.43 mass % or less in terms of oxides to 100 mass % of the magnesium-substituted montmorillonite. Table 2 shows a cordierite composition (mass %) of smectite used as the inorganic binder.

In Comparative Example 5, the procedure of Example 1 was repeated except that 6.0 parts by mass of the magnesium-substituted montmorillonite was used as the inorganic binder as described above, to manufacture 10 honeycomb structures. Furthermore, in Comparative Example 6, the procedure of Example 1 was repeated except that 4.0 parts by mass of the magnesium-substituted montmorillonite was used as the inorganic binder as described above, to manufacture 10 honeycomb structures. As to each obtained honeycomb structure, evaluation of crack defects during firing and measurement of a thermal expansion coefficient were carried out. Table 2 shows the result. In each honeycomb structure of Comparative Example 5, any crack defects were not confirmed in end faces. However, the thermal expansion coefficient of the honeycomb structure of Comparative Example 5 was $0.73 \times 10^{-6}/°$ C., and an increase of the thermal expansion coefficient was confirmed as compared with honeycomb structures of Examples 1 to 11. As to the honeycomb structures of Comparative Example 6, the crack defects were confirmed in the all the prepared 10 honeycomb structures.

INDUSTRIAL APPLICABILITY

The present invention is suitably used in various separating/purifying devices which are effective as measures to prevent environmental pollution and global warming, in various fields of chemistry, electric power, iron and steel, industrial waste disposal and others.

DESCRIPTION OF REFERENCE NUMERALS

1: partition wall, 2: cell, 3: circumferential wall, 4: honeycomb structure body, 11: first end face, 12: second end face, and 100: honeycomb structure.

The invention claimed is:
1. A manufacturing method of a honeycomb structure comprising:
 a forming step of preparing a forming raw material containing forming materials that create cordierite and an inorganic binder, and kneading and forming the prepared forming raw material, to prepare a formed body of a honeycomb shape; and
 a firing step of firing the prepared formed body of the honeycomb shape to obtain the honeycomb structure containing cordierite as a main component,
 wherein in the forming step, as the inorganic binder, smectite is used in which at least parts of interlayer metal cations are ion-exchanged with non-metal cations,
 in the smectite, a total amount of sodium to be contained in the smectite is 1.6 mass % or less in terms of oxides to 100 mass % of the smectite, and
 a content ratio of the smectite in the forming raw material is 0.5 parts by mass or more and 4.0 parts by mass or less to 100 parts by mass of the forming materials that create cordierite.
2. The manufacturing method of the honeycomb structure according to claim 1, wherein as the smectite, a Na type smectite is used in which the interlayer metal cations are sodium ions.
3. The manufacturing method of the honeycomb structure according to claim 2, wherein as the smectite, an ion-exchanged smectite is used in which the non-metal cations are ammonium ions.

* * * * *